(12) United States Patent
Fumagalli et al.

(10) Patent No.: US 7,460,783 B2
(45) Date of Patent: Dec. 2, 2008

(54) METHOD AND APPARATUS FOR DYNAMIC PROVISIONING OF RELIABLE CONNECTIONS IN THE PRESENCE OF MULTIPLE FAILURES

(75) Inventors: Andrea Fumagalli, Dallas, TX (US); Sandeep Darisala, Richardson, TX (US); Parthasarathy Kothandaraman, Richardson, TX (US); Marco Tacca, Richardson, TX (US); Luca Valcarenghi, Vercelli (IT); Maher Ali, Plano, TX (US); David Eli-Dit-Cosaque, Richardson, TX (US)

(73) Assignee: Alcatel Lucent, Paris (FR)

( * ) Notice: Subject to any disclaimer, the term of this patent is extended or adjusted under 35 U.S.C. 154(b) by 743 days.

(21) Appl. No.: 10/677,615

(22) Filed: Oct. 2, 2003

(65) Prior Publication Data

US 2004/0170426 A1 Sep. 2, 2004

Related U.S. Application Data

(60) Provisional application No. 60/450,634, filed on Feb. 28, 2003.

(51) Int. Cl.
*G02F 1/00* (2006.01)

(52) U.S. Cl. .................. 398/5; 398/1; 398/2; 398/3; 398/4; 398/7; 398/10; 398/12; 398/17; 398/19; 398/45; 398/48; 398/50; 398/54; 398/56; 398/57; 398/33; 398/31; 398/59; 370/216; 370/217; 370/221; 370/224; 370/227; 370/228; 370/389; 370/238

(58) Field of Classification Search ............. 398/1, 398/2, 3, 4, 5, 7, 10, 12, 17, 19, 57, 33, 59, 398/45, 31, 54, 48, 50, 56; 370/216, 217, 370/221, 222, 224, 227, 228, 389, 238
See application file for complete search history.

(56) References Cited

U.S. PATENT DOCUMENTS

| | | | | |
|---|---|---|---|---|
| 7,039,005 B2 * | 5/2006 | Jenq et al. | ............... | 370/217 |
| 2002/0093954 A1 * | 7/2002 | Weil et al. | ............... | 370/389 |
| 2004/0109683 A1 * | 6/2004 | Mistry et al. | ............... | 398/5 |

OTHER PUBLICATIONS

S. Darisala et al.; "On the Convergence of the Link-State Advertisement Protocol in Survivable WDM Mash Networks"; The 7th IFIP Working Conference on Optical Network Design & Modeling (ONDM), 2003; pp. 1-15.

Ramamurthy, et al.; Capacity Performance of Dynamic Provisioning in Optical Networks; Journal of Lightwave Technology; Jan. 2001; pp. 40-48.

(Continued)

*Primary Examiner*—Hanh Phan

(57) ABSTRACT

Method and apparatus for dynamic provisioning of reliable connections in the presence of multiple failures in optical networks are described. One embodiment is a method for allocation of protection paths after a failure in an optical network. The method comprises, responsive to a failure in an active lightpath, switching traffic on the active lightpath to a protection path; subsequent to the switching, identifying all active lightpaths in the network that no longer have an available protection path; and attempting to allocate a protection path to each of the identified active lightpaths.

21 Claims, 7 Drawing Sheets

OTHER PUBLICATIONS

Choi, et al.; On Double-Link Failure Recovery in WDM Optical Networks; INFOCOM 2002; Twenty-First Annual Joint Conference of the IEEE Computer and Communications Societies; 2002; vol. 2; pp. 808-816.

Sengupta, et al.; From Network Design to Dynamic Provisioning and Restoration in Optical Cross-Connect Mesh Networks: An Architectural and Algorithmic Overview; IEEE; Jul.-Aug. 2001; vol. 15, Iss. 4, pp. 46-54.

Clouqueur et al.; Availability Analysis of Span-Restorable Mesh Networks; IEEE Journal on Selected Areas in Communications; May 2002; vol. 20, Iss. 4, pp. 810-821.

Grover, W.; Distributed Restoration of the Transport Network; Network Management into the 21st Century; 1994; pp. 337-417.

* cited by examiner

METHOD AND APPARATUS FOR DYNAMIC PROVISIONING OF RELIABLE CONNECTIONS IN THE PRESENCE OF MULTIPLE FAILURES

PRIORITY UNDER 35 U.S.C. §119(e) & 37 C.F.R. §1.78

This nonprovisional application claims priority based upon the following prior United States provisional patent application entitled: DYNAMIC PROVISIONING OF RELIABLE CONNECTIONS IN THE PRESENCE OF MULTIPLE FAILURES, Ser. No.: 60/450,634, filed Feb. 28, 2003, in the names of Andrea Fumagalli, Sandeep Darisala, Parthasarathy Kothandaraman, Marco Tacca, Luca Valcarenghi, Maher Ali, and David Elie-Dit-Cosaque, which is hereby incorporated by reference for all purposes.

BACKGROUND OF THE INVENTION

1. Technical Field of the Invention

The present invention generally relates to optical networks. More particularly, and not by way of any limitation, the present invention is directed to method and apparatus for dynamic provisioning of reliable connections in the presence of multiple failures in such networks.

2. Description of Related Art

Our society is increasingly dependent upon data networks. Survivability against network failure is therefore of paramount importance to guarantee uninterrupted availability of service. Many techniques exist for ensuring network survivability in the presence of a single failure; however, few, if any, techniques exist for ensuring a comparable level of survivability in the presence of multiple failures.

A significant amount of research in network survivability in high-speed optical networks has been carried out considering single component failures, such as the failure of a link or a node. Although the majority of transport requirements are well-served by providing resilience against single failures, there exists a need to provide similar resilience against multiple, especially double, failures. The rates of fiber cuts in some networks, as well as span maintenance operations, may create situations that are modeled as double and, more generally, multiple, failures. In addition, as optical networks comprise an increasingly higher number of network elements, the probability of having more than one of those elements fail during a short time interval is not negligible.

Furthermore, when a single failure, such as a link failure, occurs, recovery from the failure usually completes within a few tens of milliseconds. However, actual reparation of the physical link may take a few hours to a few days. During this time interval, the probability of a second link failure might not be unlikely, thus resulting in a non-negligible double-failure scenario probability.

"Survivability schemes" in Wavelength Division Multiplex ("WDM") optical networks can be characterized in a variety of fashions. For example, such schemes may be "end-to-end" (i.e., path-based) or "local" (i.e., link-based); "centralized" or "distributed"; and "preplanned" (i.e., protection-oriented) or "dynamic" (i.e., restoration-oriented).

Dynamic survivability schemes (i.e., restoration-oriented schemes), can easily accommodate the occurrence of multiple failures in a network; however, such schemes provide very slow switch-over from the failed path to the protection path. Path-based survivability schemes provide protection against multiple (m) failures by providing each connection with a working path and at least m protection paths. The problem with path-based schemes resides in the need to pre-compute end-to-end backup paths, while maximizing the sharing of protection resources. Greedy heuristic algorithms to calculate the amount of protection resources to overcome double failure scenarios are available, but not efficient or practical.

Link-based survivability schemes achieve protection by rerouting traffic along end nodes of a failed link. A number of schemes have been proposed which provide resiliency against double failures based on link protection. It is numerically demonstrable that providing readily-available resources against all possible double failures corresponds to a significant increase in the overall network cost; i.e., on the order of three times the cost of providing readily available resources against all single failures.

Another approach consists of providing resilience against any single failure in such a way that the maximum number of double failures is automatically protected against. With this approach, it is not possible to ensure reliability against all double failures for every connection demand; it is only possible to minimize the number of connections that are disrupted after the occurrence of a double failure.

Yet another approach is based on loop-back recovery. Different schemes that aim toward providing protection against double link failures are available. Other proposed schemes different in the amount of signaling required. There are also schemes that require the identification of failed links, knowledge of the order in which the failures occurred, and upon the second failure, memory of the first failure. Other schemes require only knowledge of the end nodes of the failed links irrespective of the sequence of the failures.

Path-based protection schemes suffer a high increase in the amount of resources that must be reserved, even when sharing of protection resources is efficiently utilized. The total amount of resources that have to be provisioned to provide resiliency to all connections against all double failures is nearly double the total amount of resources needed to provide resiliency to all connections against single failures. This cost increase is more pronounced when using dedicated path techniques.

Similar observations can be made with respect to link-based techniques. Additionally, while path-based techniques work at the Optical Channel layer in ITU G.872, link-based techniques are implemented at the Optical Multiplex Section ("OMS") layer, making it more difficult to differentiate among the reliability requirements of various lightpaths.

SUMMARY OF THE INVENTION

Accordingly, the present invention advantageously provides method and apparatus for dynamic provisioning of reliable connections in the presence of multiple failures in an optical network.

One embodiment is a method for allocation of protection paths after a failure in an optical network. The method comprises, responsive to a failure in an active lightpath, switching traffic on the active lightpath to a protection path; subsequent to the switching, identifying all active lightpaths in the network that no longer have an available protection path; and attempting to allocate a protection path to each of the identified active lightpaths.

Another embodiment is a method of allocating protection paths in an optical network. The method comprises, responsive to a failure in the network, for each active lightpath affected by the failure, switching traffic from the affected active lightpath to a protection path thereof; subsequent to the switching, classifying as orphans all active lightpaths in the network that no longer have an available protection path as a result of the failure; and attempting to allocate a protection path to each of the orphans each time an active lightpath is released in the network.

Another embodiment is a system for allocating protection paths after a failure in an optical network. The system comprises means responsive to a failure in an active lightpath for switching traffic on the active lightpath to a protection path; means for identifying all active lightpaths in the network that no longer have an available protection path subsequent to the switching; and means for attempting to allocate a protection path to each of the identified active lightpaths each time an active lightpath is released in the network.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
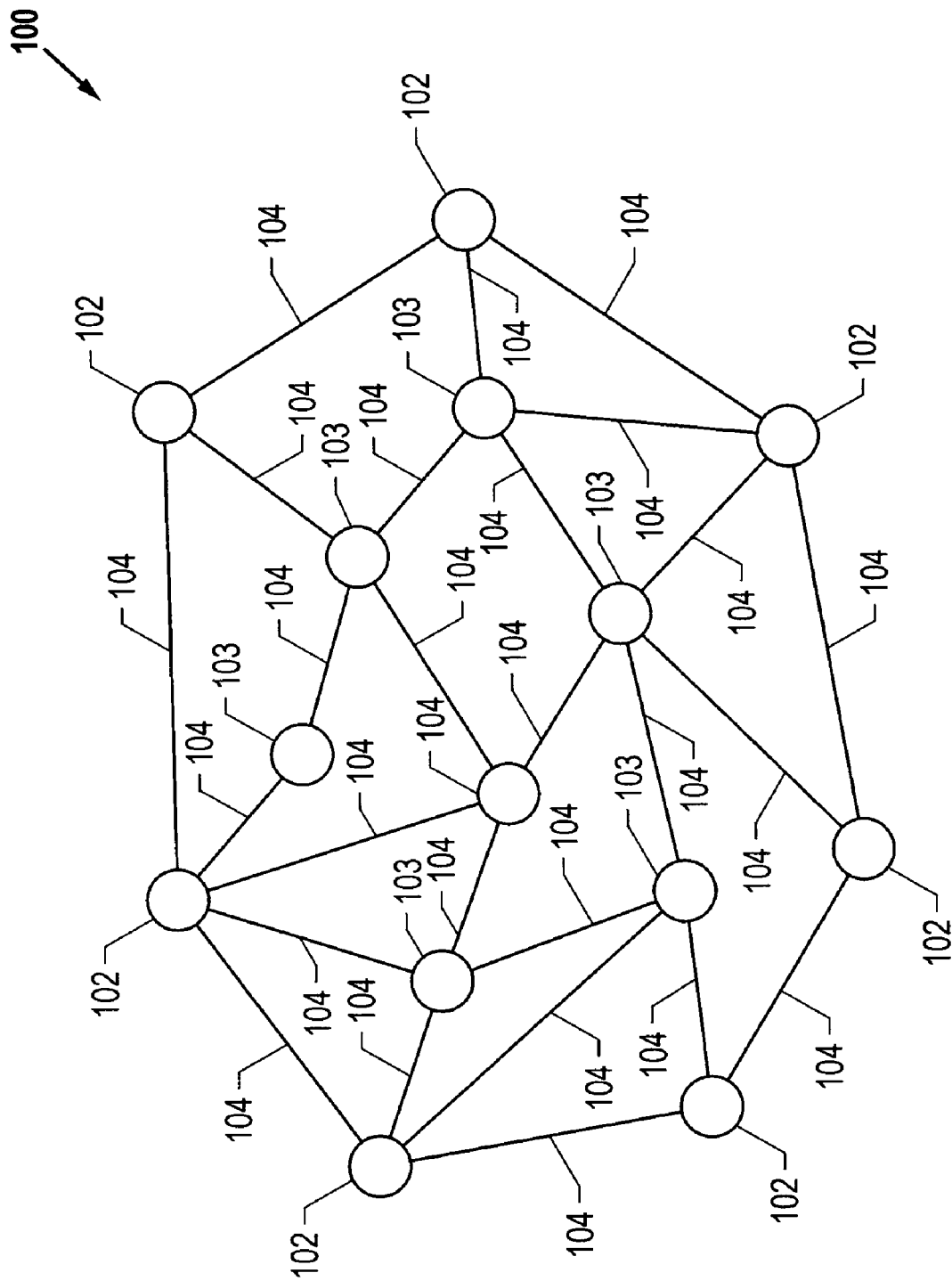
FIG. 1 is a functional block diagram of an optical network for implementing one embodiment.

In the drawings, like or similar elements are designated with identical reference numerals throughout the several views thereof, and the various elements depicted are not necessarily drawn to scale.

FIG. 1 illustrates an optical network 100 comprising a plurality of edge nodes 102 and intermediate nodes 103 interconnected by links 104. Although not illustrated in FIG. 1, in one embodiment, each link 104 corresponds to a fiber pair, one fiber for each direction of propagation, and each fiber can carry up to sixteen wavelengths.

In general, one embodiment is a protection scheme, referred to herein as "Orphan Re-routing" ("ORR"), which may be implemented in an optical network, such as the network 100. As previously indicated, conventional multi-failure protection schemes provide spare resources to be used in case of simultaneous double network element failures, which corresponds to a significant cost increase in the overall network cost. With ORR, backup resources are provisioned to ensure survivability against any single fault, using conventional protection techniques. As will be described in greater detail below, upon the occurrence of a first failure, every active, or working, lightpath affected by the fault will resort to its protection resources, maintaining service unaffected. As a result, some of the active lightpaths, will not have sufficient protection resources to provide survivability against an additional failure. Any working path that does not have sufficient protection resources to provide survivability against failure is referred to herein as an "orphan".

Figure 2A:
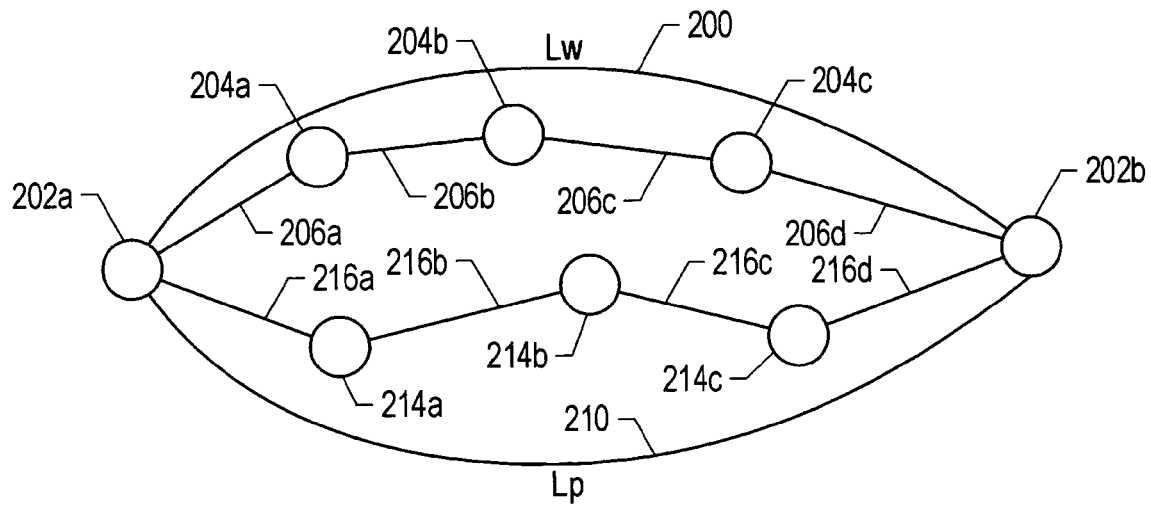
FIGS. 2A-2E illustrate the concept of "orphans" in connection with an Orphan Re-Routing ("ORR") scheme of one embodiment.

FIGS. 2A-2E illustrate the concept of orphans. Referring to FIG. 2A, a first path 200 interconnecting two edge nodes 202a, 202b, via nodes 204a-204c and links 206a-206d, is a working path ("$L_W$"). A second path 210 between the two edge nodes 202a, 202b, comprising nodes 214a-214c and links 216a-216d, is designated as a dedicated protection path $L_P$ for the working path 200.

Figure 2B:
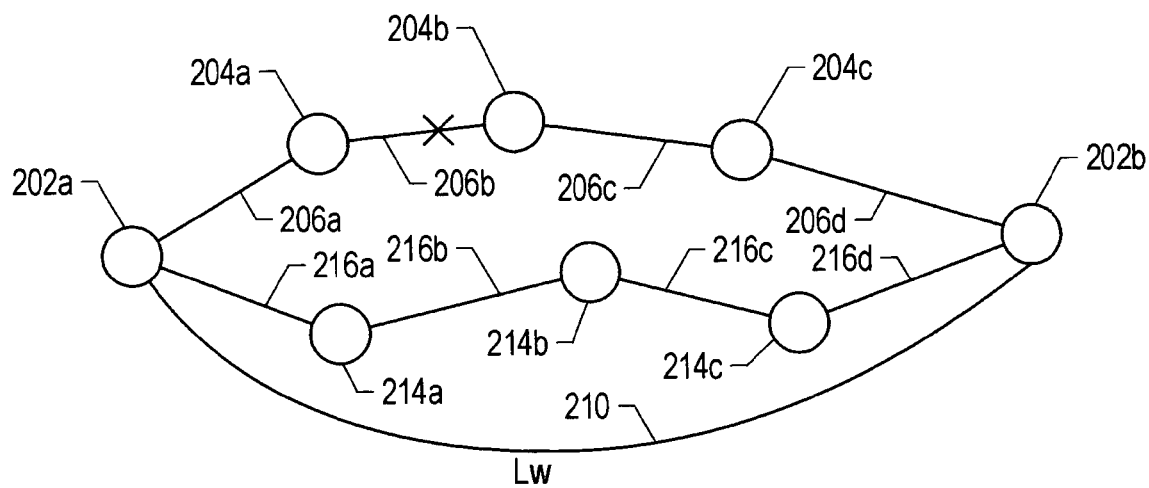

It will be assumed for the sake of example that a fault occurs somewhere along the working path 200, e.g., in the link 206b, as indicated in FIG. 2B by an "X" through that link. As illustrated in FIG. 2B, at this point, traffic on the failed path 200 is switched to the protection path 210, which becomes a working path $L_W$ and the resources comprising the path 200 are released. It will be recognized that the failure of the path 200 may result from the failure of any of nodes 204a-204c or links 206a-206d. As will be evident from FIG. 2B, the path 210, which is now a working path, is an orphan, because there are no protection resources allocated to it.

Figure 2C:
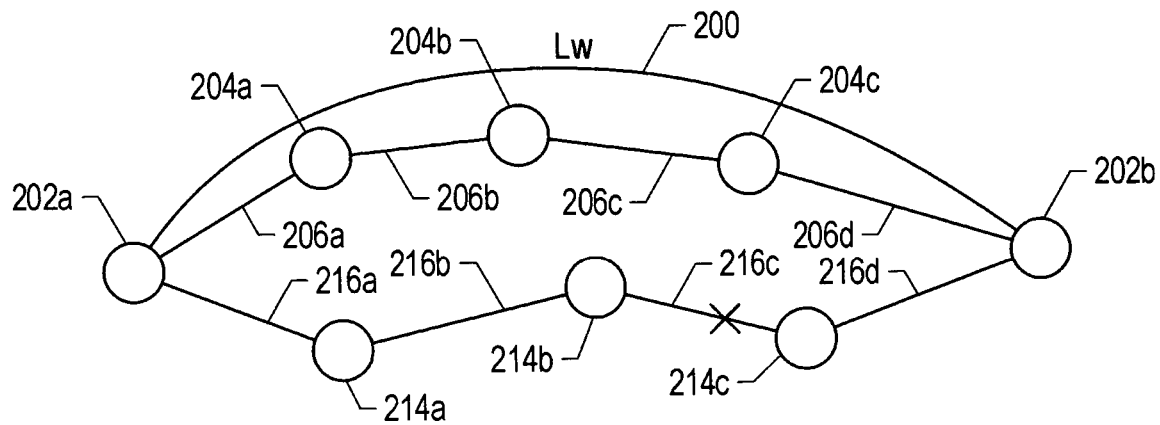

Referring again to FIG. 2A, it will be assumed that instead of a failure occurring in the working path 200, a failure occurs in the protection path 210, e.g., on the link 216c as indicated in FIG. 2C by an "X" through that link. In this case, as illustrated in FIG. 2C, the resources comprising the protection path 210 will be released and the path 200, which remains a working path, is orphaned because it has no protection resources allocated to it.

Figure 2D:
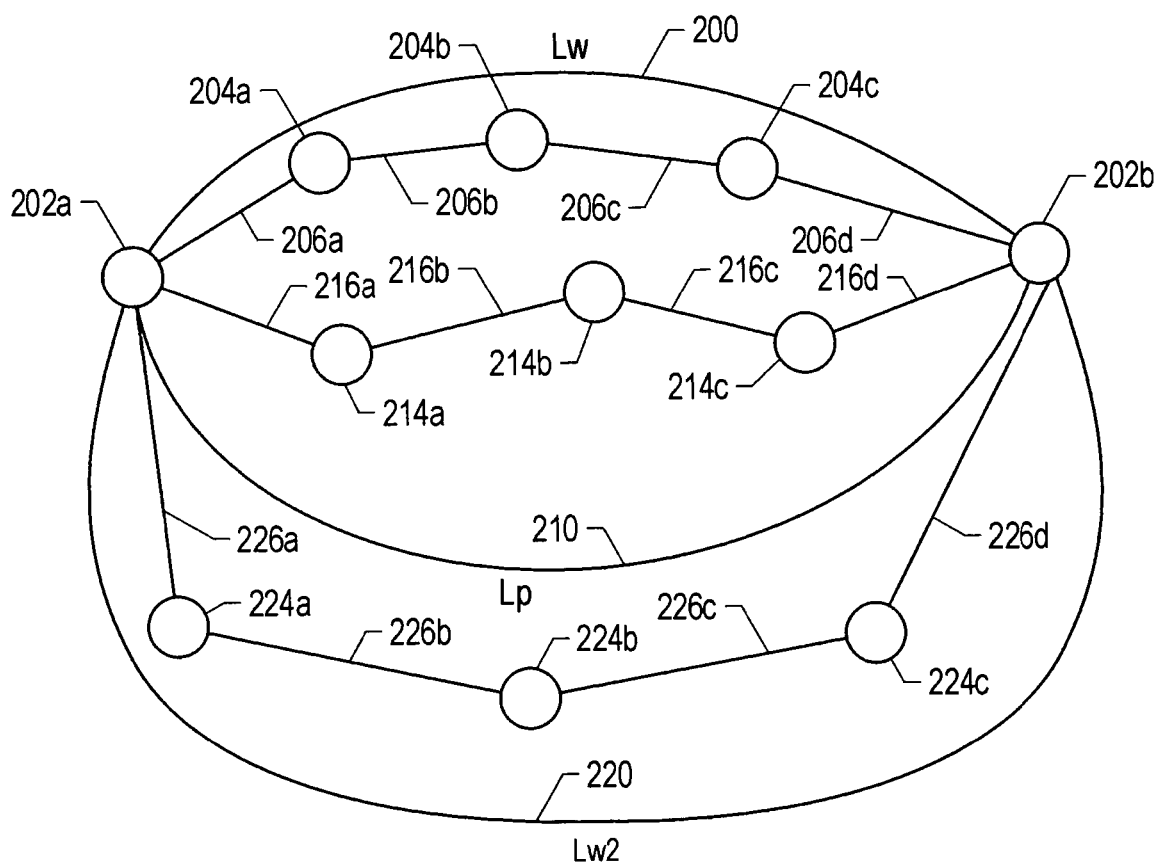
Figure 2E:
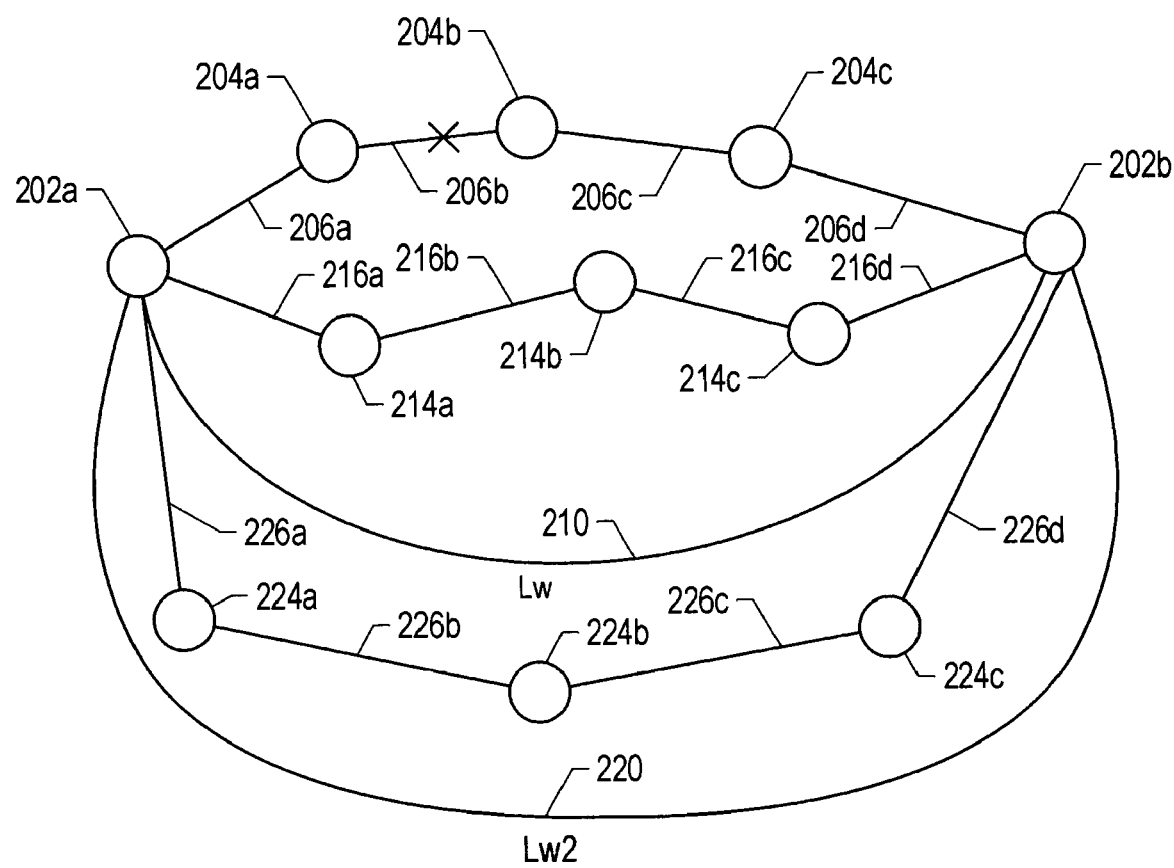

FIGS. 2D-2E illustrate another manner in which an existing working path may be orphaned. FIG. 2D is identical to FIG. 2A except that an additional working path 220 ("$L_{W2}$") between the edge nodes 202a, 202b, has been set up. The second working path 220 comprises nodes 224a-224c and links 226a-226d. It will be assumed for the sake of example that at least a portion of the resources comprising the path 210 have been designated as protection resources for the working path 220. Assuming now that a failure occurs in the path 200, e.g., in the link 206b. At this point, as described above with reference to FIG. 2B, and as illustrated in FIG. 2E, traffic from the working path 200 is switched to the protection path 210, which thereby becomes a working path, and the resources comprising the working path 200 are released. As previously indicated, this results in the path 210 becoming an orphan because it has no protection resources allocated to it. Additionally, because the path 210 is now a working path, the path 220 has lost its protection path (which comprised at least a portion of the path 210), the path 220 is an orphan.

In general, an "orphan set" contains connections that are vulnerable to a second failure, i.e., orphans. As will be described in greater detail below, the ORR scheme attempts to allocate resources in a timely manner to connections in the orphan set in order to minimize the time period during which the network is vulnerable. The ORR scheme takes advantage of the dynamic nature of an optical network.

In particular, immediately after a first failure, attempts are made to try to locate protection resources for orphan connections using the available network resources and existing schemes for computing protection paths for each of the working paths in the network. Each time an active network connection is released, a subsequent attempt is made to find protection resources for orphans for which such resources have not yet been found. During this time period, and before a second fault occurs, no traffic is disrupted.

The ORR scheme deals with multiple link failures that do not occur simultaneously in a network, but are separated by a time interval $\Delta T$. The underlying assumption, therefore, is that the probability of having two failures within a time interval $t \leq \Delta T$ is negligible.

Any standard protection scheme that provides reliability against a single network failure can be extended using the ORR scheme described herein. For purposes of example herein, an application of the ORR scheme wherein a Dedicated Path Protection ("DPP") scheme is used to compute the protection path for each working path will first be described. Using the DPP scheme, each connection is provisioned a working path and a route disjoint dedicated protection path, as illustrated in FIG. 2A with the path 200 comprising the working path and the path 210 comprising a route disjoint dedicated protection path for the working path 200. The DPP scheme ensures 100% survivability against any single network element failure; the ORR enhancement to the DPP scheme as described hereinbelow provides survivability against multiple network element failures that occur within a time interval $t > \Delta T$.

Figure 3:
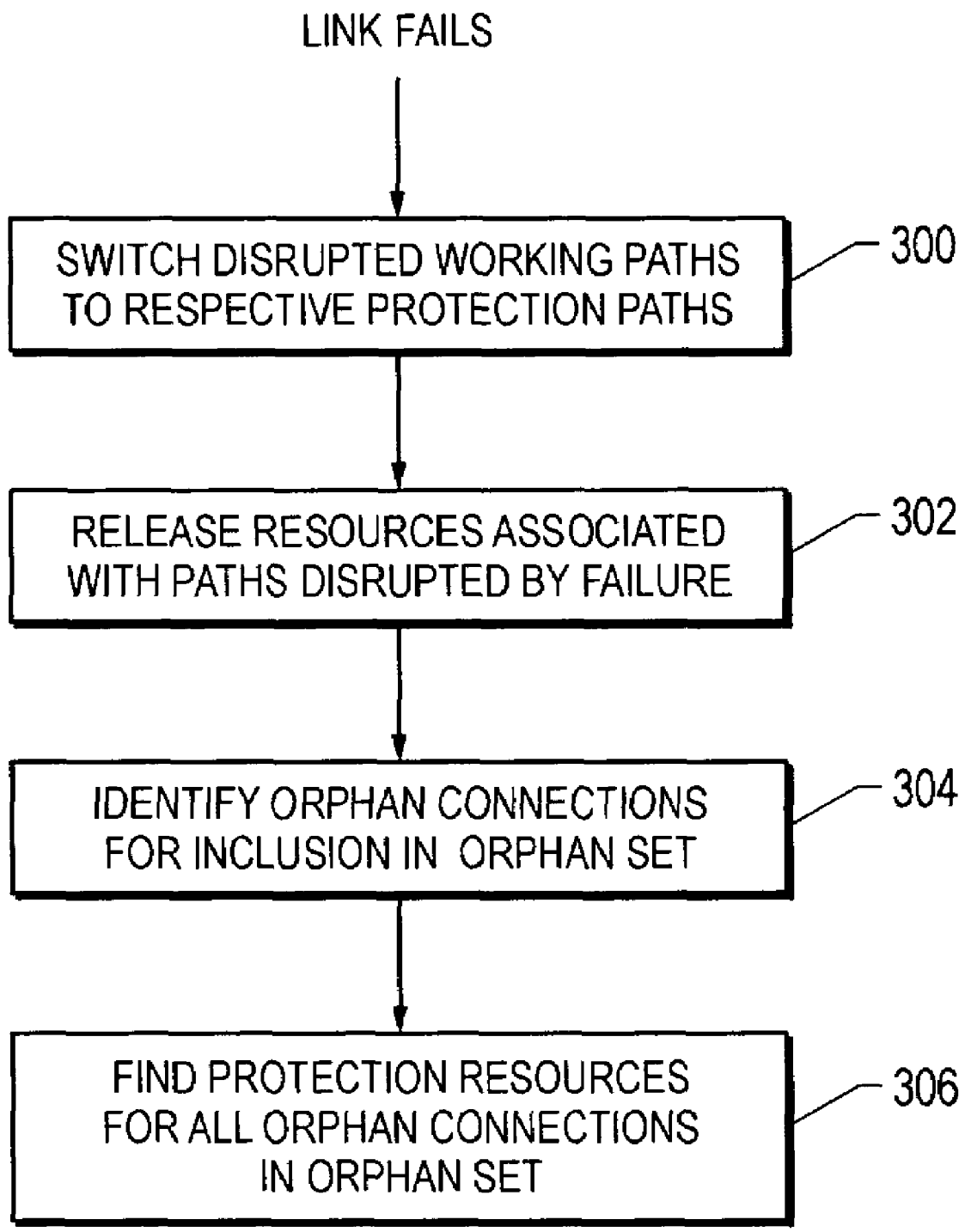
FIG. 3 illustrates a flowchart of the operation of an embodiment of the ORR scheme wherein a Dedicated Protection Path ("DPP") scheme is used to compute the protection path for each working path.

FIG. 3 illustrates a flowchart of the operation of an embodiment of the ORR scheme wherein the DPP scheme is used to compute the protection path for each working path. In block 300, responsive to a first failure disrupting a link L, for example, disrupted working paths (i.e., those paths that traverse the link L) are switched to their respective protection paths. In block 302, resources associated with working and protection paths that are routed along the link L are released, as those paths can no longer be utilized. In block 304, orphan connections are identified and included in an orphan set. In a conventional DPP implementation, two types of orphans can result from a failure: (1) connections whose working path is routed along the link L and (2) connections whose protection path is routed along the link L.

In block 306, successive attempts to find protection resources for all of the orphan connections in the orphan set are made until such resources are found. The attempts of block 306 are made using the available network resources and existing schemes for computing protection paths for each of the working paths in the network. In particular, a first attempt to find protection resources for each orphan is made immediately after the occurrence of the first fault. Successive attempts are triggered whenever there is a connection release, making new resources available.

A bucket-based shared path protection ("SPP") scheme, such as that described in S. Darisala, et al., "On the Convergence of the Link State Advertisement Protocol in Survivable WDM Mesh Networks," ONDM '03, 2003 (hereinafter "Darisala et al."), may also be used to compute the protection path in connection with application of the ORR scheme.

The bucket-based SPP scheme assigns each connection a working path and a route disjoint protection path. In contrast to the DPP scheme, protection paths are not dedicated; rather, protection resources can be shared among different working paths so long as the corresponding working paths are route disjoint. This is the situation illustrated in FIGS. 2D and 2E.

The conventional implementation of the bucket-based SPP scheme provides survivability against double failures that do not simultaneously affect the working and protection paths provisioned to a connection or that do not simultaneously affect two paths that share common protection resources.

Figure 4:
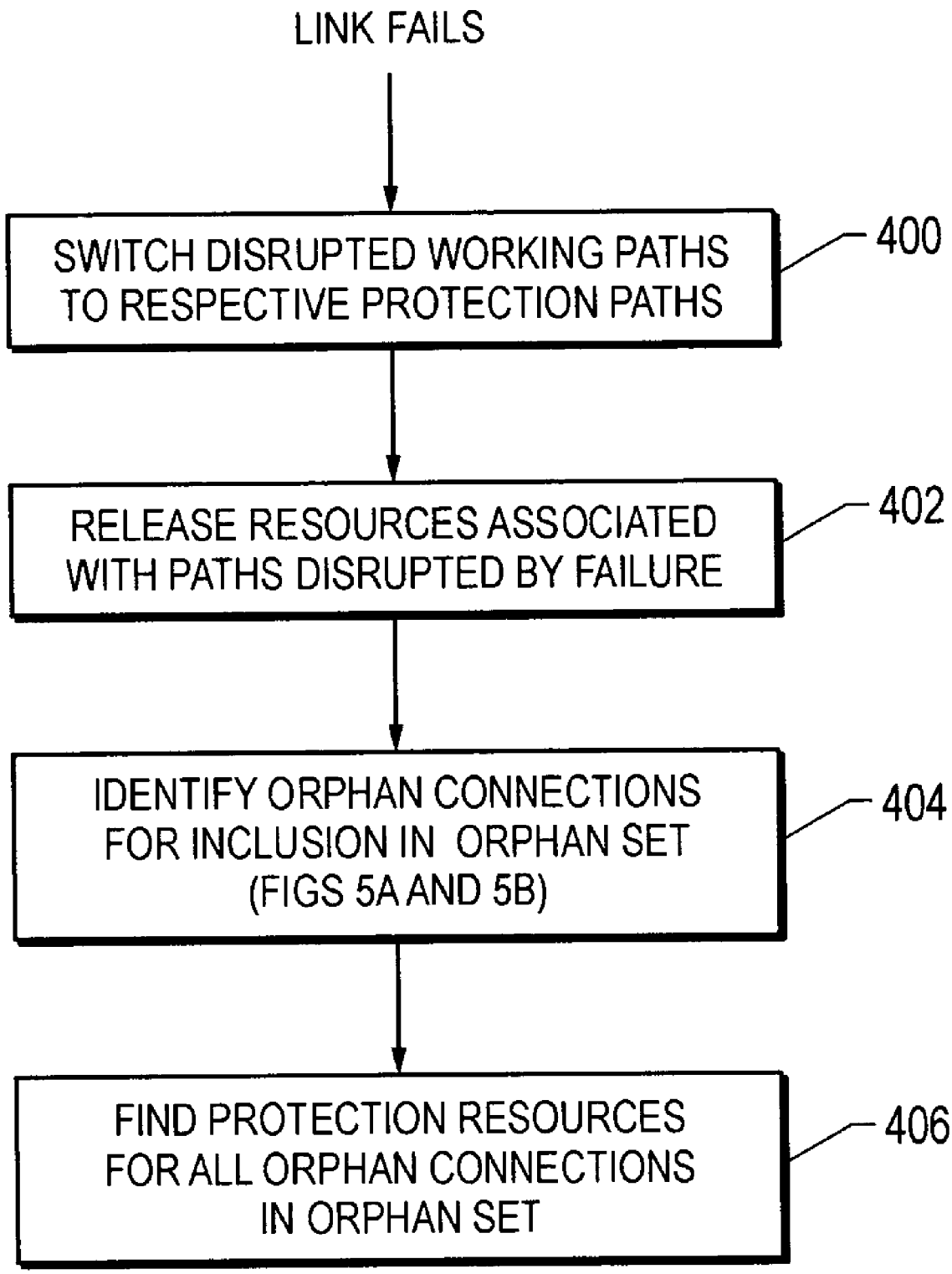
FIG. 4 illustrates the operation of one embodiment of the ORR wherein a bucket-based Shared Protection Path ("SPP") scheme is used to compute the protection path for each working path.

FIG. 4 illustrates the operation of one embodiment of the ORR wherein the bucket-based SPP scheme is used to compute the protection path for each working path. In block 400, upon the occurrence of a first failure that disrupts a link L, the disrupted working paths are identified and traffic is switched to the corresponding protection paths. In block 402, resources associated with working and protection paths that are routed along the link L are released, as those paths can no longer be used. In block 404, orphan connections are identified and included in an orphan set.

In a conventional SPP implementation, there are three, rather than two, types of orphans that can result from a failure: (1) connections whose working path is routed along the link L ("Type 1 orphans"); (2) connections whose protection path is routed along the link L ("Type 2 orphans"); and (3) connections that are not directly affected by the fault but are provisioned protection resources that are shared with connections whose working path is routed along the failed link L, rendering their protection resources unavailable ("Type 3 orphans"). In block 406, attempts to find protection resources for all of the orphan connections in the orphan set are made. As previously noted, the attempts of block 406 are made using the available network resources and existing schemes for computing protection paths for each of the working paths in the network.

Figure 5A:
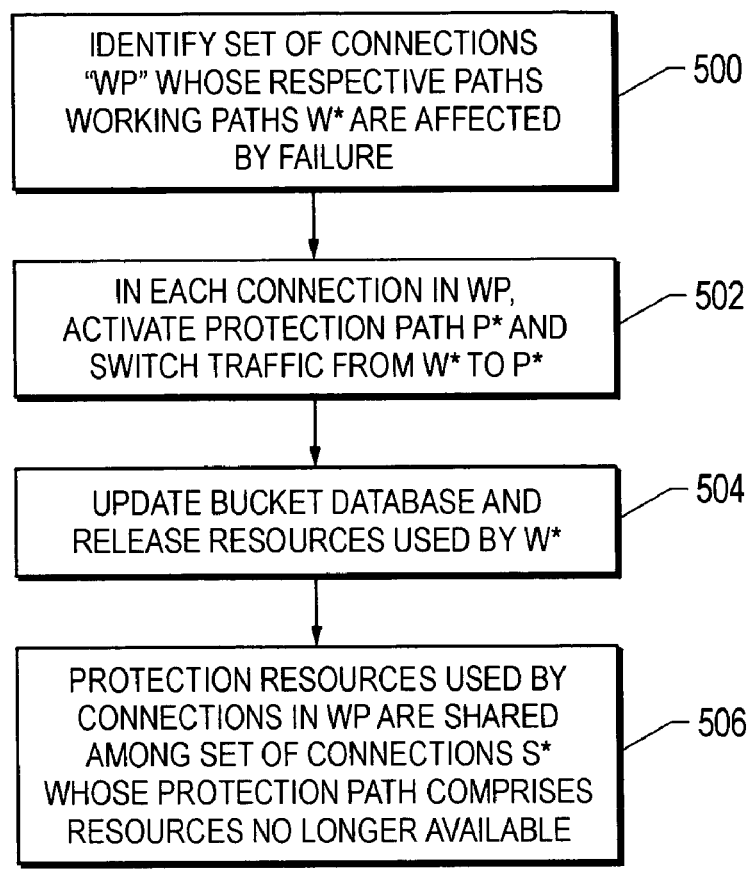
FIGS. 5A and 5B respectively illustrate a first phase and a second phase of the embodiment of FIG. 4 for identifying various types of orphans.
Figure 5B:
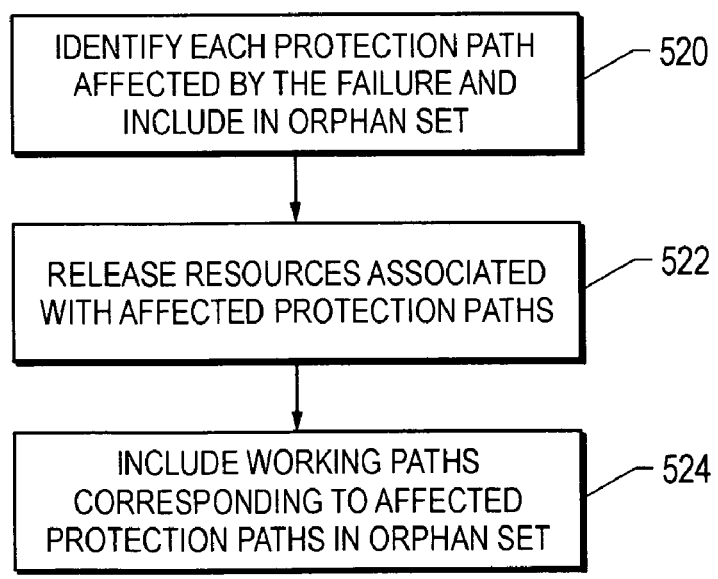

Resource sharing complicates the identification and maintenance of orphan connections in the SPP scheme. The procedure described hereinbelow with reference to FIGS. 5A and 5B is used to determine which connections are in fact orphans to be included in the orphan set (block 404). The procedure is divided into two phases; the first phase detects the Type 1 orphans and Type 3 orphans, while the second phase detects Type 2 orphans.

FIG. 5A illustrates the first phase of the procedure of block 404. In step 500, a set of connections WP whose respective workings path w* are affected by the failure is identified. In block 502, for each connection in WP, the respective protection path p* is activated and the traffic is switched from w* to p*. These connections are Type 1 orphans. In block 504, a bucket database is updated and resources used by the working paths w* are released using the procedure described in Darisala et al. In block 508, protection resources used by the connections in WP are shared among a set of connections S*. Each connection included in the set S* is one whose working path and protection path are not directly affected by the failure, but whose protection path comprises resources that are no longer available. Connections in S* are Type 3 orphans.

Each link k along each activated protection path p* needs to be checked. As protection resources are used by one connection, they cannot be used by other connections in S*. If enough additional bandwidth is available for providing new protection resources to connections in S*, after the first failure, then the appropriate amount of bandwidth is allocated. Otherwise, those connections are inserted into the orphan set.

FIG. 5B illustrates the second phase. In block 520, each protection path that is affected by the failure is identified. In block 522, the resources associated with the affected protection paths identified in block 520 are released as described in Darisala et al. In block 524, the working path corresponding to each affected protection path identified in block 520 is inserted into the orphan set. These connections are Type 2 orphans.

It should be noted that within the orphan set, it is possible to introduce priorities among the connections, thus permitting attempts to find paths for connections with more stringent reliability requirements to be made before similar attempts are made with respect to connections with lower reliability requirements. Additionally, strategically provisioned spare resources that are not used for working or protection paths can be used to speed up the ORR process.

Several advantages over the prior art are realized by the embodiments described herein. Such advantages include that the ORR scheme can be based on any path-based protection scheme and can support enhanced versions of such schemes.

Such modifications include providing additional standby resources on critical links in order to reduce the vulnerability time of a network. These additional standby resources represent a tradeoff between cost of the provisioned resources and degree of reliability offered.

The proposed ORR scheme offers an effective compromise between readiness in response to failure, typical of protection techniques, and efficiency in resource utilization, typical of restoration techniques. The proposed approach is based on a two-step paradigm. The first step consists of preallocating standby resources that ensure 100% protection guarantee against any single failure. The second step occurs after the occurrence of a failure and consists of reconfiguring the network to provide resources to ensure survivability against a subsequent failure that occurs after the elapse of a predetermined time interval t>ΔT.

Based upon the foregoing Detailed Description, it should be readily apparent that the present invention advantageously provides a method and apparatus for dynamic provisioning of reliable connections in the presence of multiple failures in optical networks.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method for allocation of protection paths after a failure in an optical network, the method comprising:
   responsive to a failure in an active lightpath, switching traffic on the active lightpath to a protection path;
   subsequent to the switching, identifying all active lightpaths in the network that no longer have an available protection path; and
   attempting to allocate a protection path to each of the identified active lightpaths.

2. The method of claim 1 further comprising, responsive to the switching, releasing resources associated with the active lightpath.

3. The method of claim 1 wherein the attempting begins immediately after the identifying and is performed each time an active lightpath is released in the network.

4. The method of claim 1 wherein the failure comprises a node failure.

5. The method of claim 1 wherein the failure comprises a link failure.

6. The method of claim 1 wherein the failure affects more than one active link.

7. The method of claim 6 wherein the switching is performed for each of the affected active links individually.

8. The method of claim 1 further comprising:
   identifying all protection paths affected by the failure; and
   releasing resources of all of the identified protection paths.

9. A method of allocating protection paths in an optical network, the method comprising:
   responsive to a failure in the network, for each active lightpath affected by the failure, switching traffic from the affected active lightpath to a protection path thereof;
   subsequent to the switching, classifying as orphans all active lightpaths in the network that no longer have an available protection path as a result of the failure; and
   attempting to allocate a protection path to each of the orphans each time an active lightpath is released in the network.

10. The method of claim 9 wherein the attempting is performed until a protection path is allocated to all of the orphans.

11. The method of claim 9 further comprising, responsive to the switching, releasing resources associated with the affected active lightpaths.

12. The method of claim 9 wherein the failure comprises failure of a node.

13. The method of claim 9 wherein the failure comprises failure of a link.

14. The method of claim 9 further comprising:
   identifying all protection paths affected by the failure; and
   releasing resources of all of the identified protection paths.

15. A system for allocating protection paths after a failure in an optical network, the system comprising:
   means responsive to a failure in an active lightpath for switching traffic on the active lightpath to a protection path;
   means for identifying all active lightpaths in the network that no longer have an available protection path subsequent to the switching; and
   means for attempting to allocate a protection path to each of the identified active lightpaths each time an active lightpath is released in the network.

16. The system of claim 15 further comprising means responsive to the switching for releasing resources associated with the active lightpath.

17. The system of claim 15 wherein the failure comprises a failure in a node of the network.

18. The system of claim 15 wherein the failure comprises a failure in a link of the network.

19. The system of claim 15 wherein the failure affects more than one active link.

20. The system of claim 19 wherein the switching is performed for each of the affected active links individually.

21. The system of claim 15 further comprising:
   means for identifying all protection paths affected by the failure; and
   means for releasing resources of all of the identified protection paths.

* * * * *